US007233285B2

(12) United States Patent
Struckman

(10) Patent No.: US 7,233,285 B2
(45) Date of Patent: Jun. 19, 2007

(54) CORRELATION INTERFEROMETER GEOLOCATION

(75) Inventor: Keith A. Struckman, Grand Junction, CO (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 10/543,339

(22) PCT Filed: Feb. 6, 2004

(86) PCT No.: PCT/US2004/003373

§ 371 (c)(1),
(2), (4) Date: Jul. 25, 2005

(87) PCT Pub. No.: WO2005/002070

PCT Pub. Date: Jan. 6, 2005

(65) Prior Publication Data

US 2006/0087475 A1    Apr. 27, 2006

Related U.S. Application Data

(60) Provisional application No. 60/456,299, filed on Mar. 20, 2003.

(51) Int. Cl.
*G01S 3/02* (2006.01)
(52) U.S. Cl. .................................................... 342/451
(58) Field of Classification Search ............... 342/424, 342/451
See application file for complete search history.

(56) References Cited

U.S. PATENT DOCUMENTS

| 3,935,574 | A | 1/1976 | Pentheroudaki |
| 4,734,702 | A | 3/1988 | Kaplan |
| 5,039,991 | A | 8/1991 | Boese et al. |
| 5,835,060 | A | 11/1998 | Czarnecki et al. |
| 6,064,339 | A * | 5/2000 | Wax et al. .................. 342/417 |
| 6,255,992 | B1 * | 7/2001 | Madden ...................... 342/424 |
| 2005/0007278 | A1 * | 1/2005 | Anson et al. ............... 342/451 |

OTHER PUBLICATIONS

Baum, Carl E., "Signature-Base Target of Identification and Pattern Recognition," IEEE Antennas and Propagation Magazine, vol. 36, No. 3, Jun. 1994, pp. 44-51.*

(Continued)

*Primary Examiner*—Gregory C. Issing
(74) *Attorney, Agent, or Firm*—Joseph E. Funk; Daniel J. Long

(57) ABSTRACT

Correlation Interferometer Geo Location (CIGL) uses DF antenna array movement on an aircraft while taking a Plurality of sets of transmitted signal Measurements. Each measurement set is stored as data in a covariance matrix, and the matrices are each decomposed to yield measured array vectors. Using an array manifold table developed during calibration of the CIGI. system, and containing testing array vectors, the measured array vectors are each correlated to testing array vectors to develop a correlation Surface that includes compensation for perturbations Such as aircraft induced electromagnetic scattering, All the correlation surfaces are summed and normalized, with the resultant summation undergoing conjugate gradient processing to more accurately geo-locate the transmitter. Improved accuracy with fewer antennas and polarization independence are also achieved.

18 Claims, 7 Drawing Sheets

OTHER PUBLICATIONS

Schmidt, Raplh O., "Multilinear Array Manifold Interpolation," IEEE Trans on Signal Processing, vol. 40, No. 4, Apr. 1992, pp. 857-866.*

N.M. Blackman, *Position Determination From Radio Bearings,* IEEE Transactions on Aerospace and Electronic Systems, pp. 558-560, May 1969.

E.R. Ferrara and T.M. Parks, *Direction Finding With An Array of Antennas Having Diverse Polarizations,* IEEE Transactions on Antenna Propagation, vol. AP-31, pp. 231-236, Mar. 1983.

N. Saucier and K. Struckman, *Direction Finding Using Correlation Techniques,* IEEE Antenna Propagation Society International Symposium, pp. 260-263, Jun. 1975.

* cited by examiner $$|R(x^i,y^j)|^2 = \frac{1}{Me}\sum_{m=1}^{m=Me}\left[\frac{\left|\sum_1^{na}Q_n^*(m)\left\{\rho^{p1}(m)A_n^{p1}(x^i,y^j)+\rho^{p2}(m)A_n^{p2}(x^i,y^j)\right\}\right|^2}{\left(\sum_1^{na}|Q_n(m)|^2\right)\left(\left|\sum_1^{na}\left\{\rho^{p1}(m)A_n^{p1}(x^i,y^j)+\rho^{p2}(m)A_n^{p2}(x^i,y^j)\right\}\right|^2\right)}\right]$$

Figure 10

CORRELATION INTERFEROMETER GEOLOCATION

CROSS REFERENCE TO RELATED APPLICATION

This utility patent application claims rights under 35 U.S.C. 119(e) from U.S. provisional patent application No. 60/456,299 entitled "Method For Correlation Geo-Location", and filed Mar. 20, 2003.

FIELD OF THE INVENTION

The present invention relates to direction finding and, more particularly, to correlating signals received from a remote transmitter using an antenna array to determine the geographical location of the remote transmitter.

BACKGROUND OF THE INVENTION

In the earliest prior art the method of locating the position of a remote transmitter was to utilize a direction finding (DF) triangulation technique where signals from the transmitter are received at widely spaced DF antenna sites. A line-of-bearing (LOB) measurement to the transmitter is measured at each antenna site. When the LOBs are plotted on a map they intersect at the transmitter location. The accuracy of this intersection is directly related to the accuracy of these lines-of-bearing.

A typical radio frequency interferometer system computes an AOA to a transmitter by utilizing the phase difference of the transmitter signal arriving at individual antennas of an array. A remote transmitter is located by utilizing the amplitude and phase difference of a signal from the transmitter arriving at different antennas of an antenna array. The phase measurements of the interferometer can be AOA ambiguous if the baselines of the antenna array, that is the separation of the antennas of the array and used to measure signal phase, is greater than half the wavelength of the incoming signal. The number of ambiguous AOA's is closely approximated by the ratio of the interferometer baseline to the emitter wavelength and one key to successful emitter geolocation estimation is to correctly resolve these potential ambiguities by careful DF array design and measurement processing.

As the interferometer baseline length increases, thereby increasing the number of AOA ambiguities, the phase measurement accuracy increases, and the rapidity of transmitter ranging to the required accuracy improves due to the more accurate bearing measurements. Thus, the desire for accurate bearing measurements, requiring a long interferometer baseline, conflicts with the need for robust phase or AOA ambiguity resolution, which is easier to accomplish with a short baseline. In addition, long baselines are difficult to achieve when the receiving apparatus is on an aircraft.

One technique to overcome this complexity is to use an AOA ambiguous long baseline interferometer or (LBI). One approach to passive ranging utilizing an LBI to resolve the AOA ambiguities, which are identical to the antenna array grating lobes, is by phase tracking the emitter signal during the relative motion of the platform, such as an aircraft, containing the DF antenna array. Lobe tracking is utilized in which 2n solutions are set up for an array with a length of nλ, where λ is the wavelength of the transmitter signal and n is an integer. Only one of the potential solutions converges to the true solution with the remainder being rejected as diverging. Phase tracking is continuously performed by the lobe tracking process in order to eliminate all but one of the potential solutions so that the ambiguity integer m, which determines the number of 2π cycles which must be added to the interferometer phase measurement to correctly identify the correct AOA, is determined.

The phase tracking approach has certain drawbacks. For instance, the signal can be interrupted by terrain blockage or intermittent emitter operation and the trend on the ambiguity integer m (phase tracking) is lost. Additionally, vibration can distort the trend and hinder correct ambiguity resolution. Observer attitude motion can cause large changes in the ambiguity integer, m. These changes are difficult to separate from translational motion relative to the emitter.

Another drawback to the phase tracking approach is that the number of lobes, i.e. potential solutions, is determined by the ratio of d/λ, where d is the baseline length and λ is the signal wavelength.

U.S. Pat. No. 5,835,060 entitled "Self-resolving LBI Triangulation" also teaches a long base line interferometer (LBI) system for determining the position of a transmitter. The system has two antennas and the phase differences between the signals received by the antennas at each end of the long base line are monitored as the interferometer moves along a measurement path to obtain repetitive phase difference measurements distributed along the measurement path. To determine the location of the transmitter, a cost function is evaluated to select one of a set trial grid points for the transmitter. The position of the transmitter is then estimated by least squares convergence using the selected trial grid point as a starting point.

The measured phase difference corresponds to the angle of arrival of the transmitted signal plus an unknown constant minus an unknown integer multiple of 2π. The measured phase difference (in radians) can be expressed as follows:

$$\Phi = \left[\Phi_0 + \frac{2\pi l}{\lambda} \cos\theta\right] \bmod 2\pi \tag{EQ 1}$$

in which Φ is the measured phase difference, $\Phi_0$ is an unknown constant, L is the length of the baseline of the LBI antenna, λ is the wavelength of the transmitted signal and θ is the angle of arrival of the transmitted signal relative to the LBI base line. This approach has a limitation in that it cannot handle signals from arbitrarily polarized transmissions. Computing directions to arbitrarily polarized transmissions, requires both phase and amplitude RF measurements on more than two antennas.

Another prior art passive ranging approach utilizes a short baseline/long baseline interferometer or SBI/LBI system in which at least two SBI measurements separated in time are needed to resolve the two-antenna element LBI ambiguity. This approach is described in U.S. Pat. No. 4,734,702 "Passive Ranging Method and Apparatus".

U.S. Pat. No. 5,039,991, entitled "Perturbation modeling system for use in processing direction-finding antenna outputs" teaches and claims a system for compensating for perturbations of received electromagnetic radiation caused by the various surfaces of an aircraft by correlating antenna outputs to representative data in a database that is empirically derived during calibration of the system at a plurality of scaled electromagnetic radiation frequencies to determine the proper azimuth and elevation associated with transmissions.

See also a paper by N. Saucier and K. Struckman, *Direction Finding Using Correlation Techniques*, IEEE Antenna Propagation Society International Symposium, pp.

260-263, June 1975, which teaches the same concepts as taught in U.S. Pat. No. 5,039,991.

U.S. Pat. No. 4,734,702 discloses two approaches utilizing SBI/LBI. One approach locates the target with SBI derived measurements and uses the SBI range to predict the LBI phase change. This approach requires some SBI location convergence before improving it with the LBI. The use of the SBI phase difference to initially compute a slant range means this method will not initially converge faster than a more conventional SBI-only system until range accuracy sufficient to resolve the LBI has been achieved. In order to overcome this slow initial convergence to the range estimate, a second technique is used instead, if the slow initial convergence is intolerable.

The second technique utilizes the SBI unit direction-of-arrival vector (DOA) to predict the LBI phase change. This technique does not require location to any accuracy before differentially resolving the LBI with sequential SBI measurements, and hence provides rapid convergence to an accurate range estimate. However, this SBI/LBI technique has the drawback of limiting the SBI/LBI baseline ratio, and requiring the use of a medium baseline interferometer (MBI) in many cases. It also requires a two dimensional (2-D) SBI to measure emitter direction of arrival or DOA, as opposed to just a one dimensional interferometer array measuring AOA.

The baseline restriction existing in the conventional SBI/LBI approach necessitates the addition of more antenna elements and receivers to obtain the LBI baseline required to achieve the desired range accuracy quickly. This introduces extra complexity, cost and weight to a system.

One technique to overcome the extra complexity, cost and weight is to use an AOA ambiguous long baseline interferometer or LBI. One early approach to passive ranging utilizing an LBI which may have only two antenna elements is disclosed in U.S. Pat. No. 3,935,574 by Pentheroudaki. This approach resolves the AOA ambiguities, which are identical to the antenna array grating lobes, by phase tracking the emitter signal during the relative motion of the platform containing the antenna array. Such lobe tracking is utilized in which (2n) solutions are set up for an array with a length of nλ, where λ is the transmitter signal wavelength and n is an integer. Only one of the potential solutions converges to the true solution with the remaining possible solutions being rejected as diverging. Phase tracking is continuously performed by a lobe tracking process in order to eliminate all but one of the potential solutions so that the ambiguity integer m, which determines the number of 2π cycles which must be added to the interferometer phase measurement to correctly identify the correct AOA, is determined.

As described above, a typical DF interferometer system locates a remote transmitter by utilizing the phase difference of the transmitter signal arriving at the individual antennas. DF accuracy of such systems is directly related to DF array aperture size which is determined by the spacing between multiple antennas of antenna array of the DF system. All other things being equal, larger DF apertures increase LOB accuracy generating more accurate transmitter fixes. However, simply increasing DF aperture sizes without increasing the number of DF antennas leads to large amplitude correlation side lobes and a real potential for large errors. Therefore, such prior art DF systems require many antennas and DF receivers and are very expensive. The need for more antennas and more DF receivers negatively affects their use on aircraft.

In summary, accurate transmitter geo-location computations require long baseline interferometer (LBI) accuracy's. Theoretically only three antenna elements are required for unique 2π radians azimuth coverage, but conventional DF interferometer systems must utilize a number of additional antenna elements and receivers to control the gross error rate of a resulting from the inherent AOA ambiguity in phase measurement.

As will be appreciated, the number of antenna elements required by airborne DF interferometer systems leaves a limited amount of space for other sensors on the aircraft's exterior. Thus, it is desirable to provide a DF interferometer system for aircraft that needs only a few antenna elements while providing the same or greater transmitter location accuracy as prior art systems.

SUMMARY OF THE INVENTION

Problems associated with prior art aircraft DF techniques and systems are minimized in accordance with the teaching of the present invention. A novel method and apparatus for providing a highly accurate correlation interferometer geo-location (CIGL) system is taught that requires fewer antennas and associated receivers than used in the prior art while providing highly accurate geo-location information. Very broadly, this is accomplished by moving correlation processing from the correlation interferometer direction finding AOA function into the transmitter location function. Correlation interferometer direction finding (CIDF) solutions are based on the correlation summation of voltages measured at the antennas of a DF antenna array.

The novel CIGL system taught herein digitally correlates sets of measured antenna array voltage vectors against a calibration array manifold that is indexed as a function of grid locations on a correlation surface. This moves the correlation function directly to the surface of the earth and provides geolocation information of transmitters.

In operation, signals received on the antennas of a DF antenna array are sampled, digitized and stored in covariance matrices. The typical CIGL geolocation processing sequence is to Nyquist sample the received signal and record a set of samples for each antenna of the DF antenna array. Msts sets of these signal samples are measured and processed into individual measurement covariance in matrices during the search for the location of the transmitter, typically one set for each second of flight. The number of sets Msts, is operationally based on the range to the transmitter and the length of the transmission, where the value of Msts is usually between 10 and 100. The covariance processed signal samples undergo eigenspace decomposition to produce Msts signal eigenvectors containing azimuth and elevation (θ,φ) radio wave arrival information for each of the sampling periods. To correct for array distortions, such as aircraft electromagnetic scattering, a correlation table constructed during system calibration is accessed and mapped as the Msts correlation surfaces are computed. Thus, data is collected and used for the computation of Msts correlation surfaces.

The data sets defining the Msts correlation surfaces are summed and normalized to produce a summation correlation surface, which is then used to accurately identify the geolocation of a remote transmitter with respect to the aircraft. Summing the computed, sequential, correlation surfaces reduces extraneous correlation peaks and develops a correlation surface maximum at the correct geolocation of the remote transmitter.

Each independent correlation surface has a number of peaks, valleys and ridge lines. Under ideal conditions, the highest ridge line of each independent surface points in the direction from the aircraft to the transmitter. One ridge line of the summation correlation surface contains a well defined peak that is higher than the correlation values at all other pixel locations. The location of this peak indicates the geolocation of the transmitter. The height of the peak is an indication of the accuracy of the geolocation process.

To accurately locate the highest peak to thereby identify the geolocation of the transmitter, a conjugate gradient search routine is applied to the summation correlation surface. Signal polarization independence is also provided.

DESCRIPTION OF THE DRAWING

The invention will be better understood upon reading the following Detailed Description in conjunction with the drawing in which:

FIG. 10 is the summation and normalization algorithm used to provide polarization independence to the novel CIGL process.

DETAILED DESCRIPTION

In the following detailed description and the drawings there are numerous terms used that are defined below:
$A^{p1}(\theta,\phi)$ and $A^{p2}(\theta,\phi)$=orthogonal calibration array manifolds
$A_r$=antenna array response vector
AOA=angle of arrival
CIDF=Correlation interferometer direction finding
CIGL=correlation interferometer geo-location
DF=direction finding
E=electromagnetic radio waves incident on the array of antennas
LBI=long base line interferometer
LOB=lines of bearing
MBI=medium base line interferometer
Na=number of antennas in the beam forming/direction finding array
$(O)^*$=complex conjugate of $(O)$
PI-CIGL=polarization independent correlation interferometer geo-location
Q=signal eigenvector of the measured covariance matrix
$|R(x^i,y^j)|^2$=global correlation surface over a set of $(x^i,y^j)$ grid points
Rxx=measured covariance matrix
SBI=short base line interferometer
SNR=signal-to-noise ratio
$V_n(\theta,\phi)$ and $H_n(\theta,\phi)$=vertical and horizontal calibration array manifolds
V(n,t) antenna voltage received at antenna "n"
$\rho^k$=polarization vector
$\lambda$=eigenvalues of the measured covariance matrix In the following description eigenspace is defined as follows. If $R_{xx}$ is an Na×Na square matrix and $\lambda$ is an eigenvalue of $R_{xx}$, then the union of the zero vector 0 and the set of all eigenvectors corresponding to eigenvalues $\lambda$ is known as the eigenspace of $\lambda$. The terms eigenvalue and eigenvector are well known in the art.

In the following description reference is made to eigenspace decompositions. eigenspace decompositions are well known in the art and are used in solving many signal processing problems, such as source location estimation, high-resolution frequency estimation, and beam forming. In each case, either the eigenvalue decomposition of a covariance matrix or the singular value decomposition of a data matrix is performed. For adaptive applications in a non-stationary environment, the eigenvalue decomposition is updated with the acquisition of new data and the deletion of old data. This situation arises where a transmitter or receiver are moving with relation to each other. For computational efficiency or for real-time applications, an algorithm is used to update the eigenvalue decomposition code without solving the eigenvalue decomposition problem from the start, i.e., an algorithm that makes use of the eigenvalue decomposition of the original covariance matrix. In numerical linear algebra, this problem is called the modified eigenvalue problem. In the example of the invention disclosed herein, with only one signal being received, the array vector for that signal is equal to its eigenvector.

Figure 1:
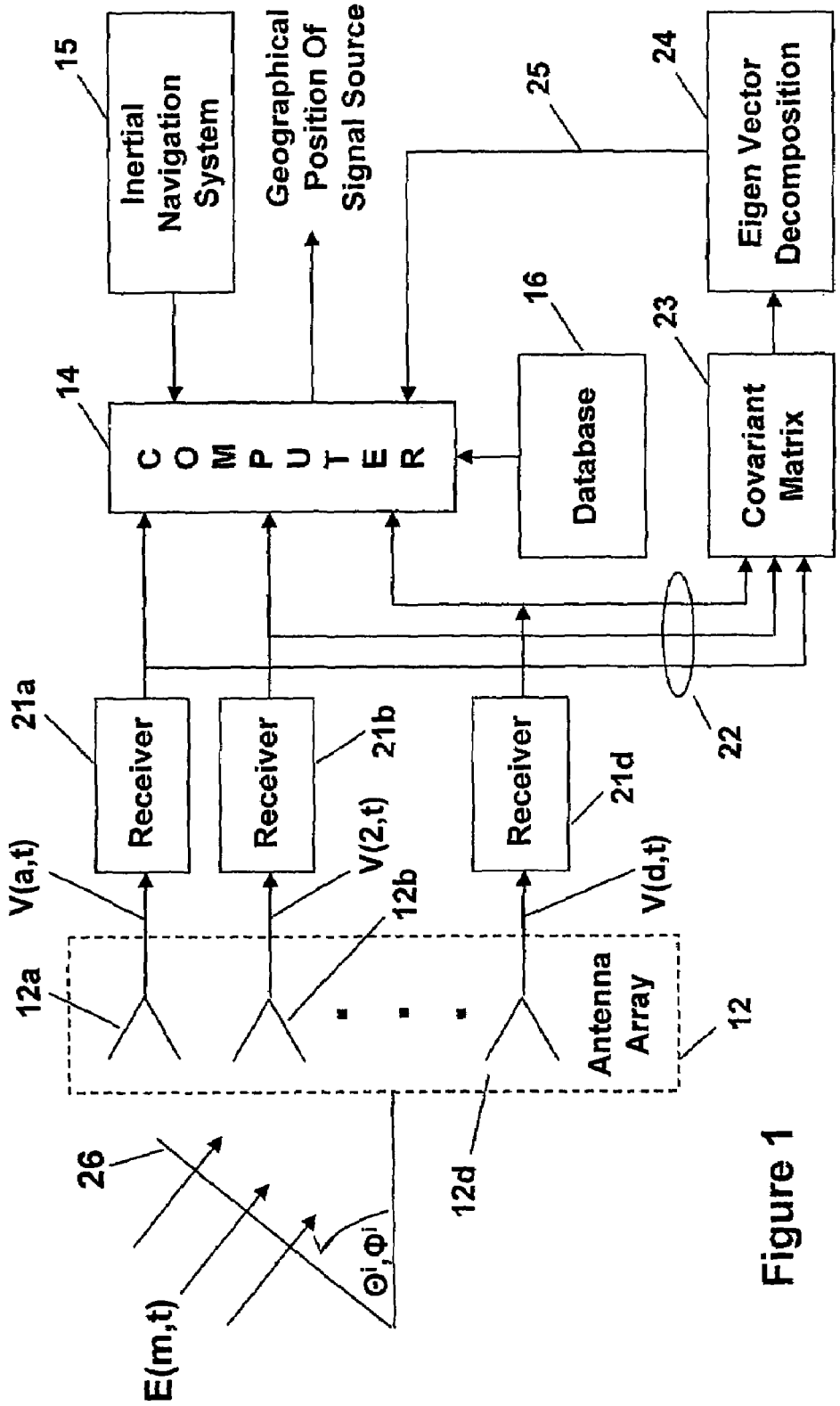
FIG. 1 is a detailed block diagram of a DF system that utilizes the teaching of the present invention to provide geolocation information for a transmitter remote to an aircraft.

In FIG. 1 is a detailed block diagram of a DF system that utilizes the teaching of the present invention to provide CIGL geographical position (geolocation) information for remote transmitters 11 that are not shown in this Figure.

Figure 2:
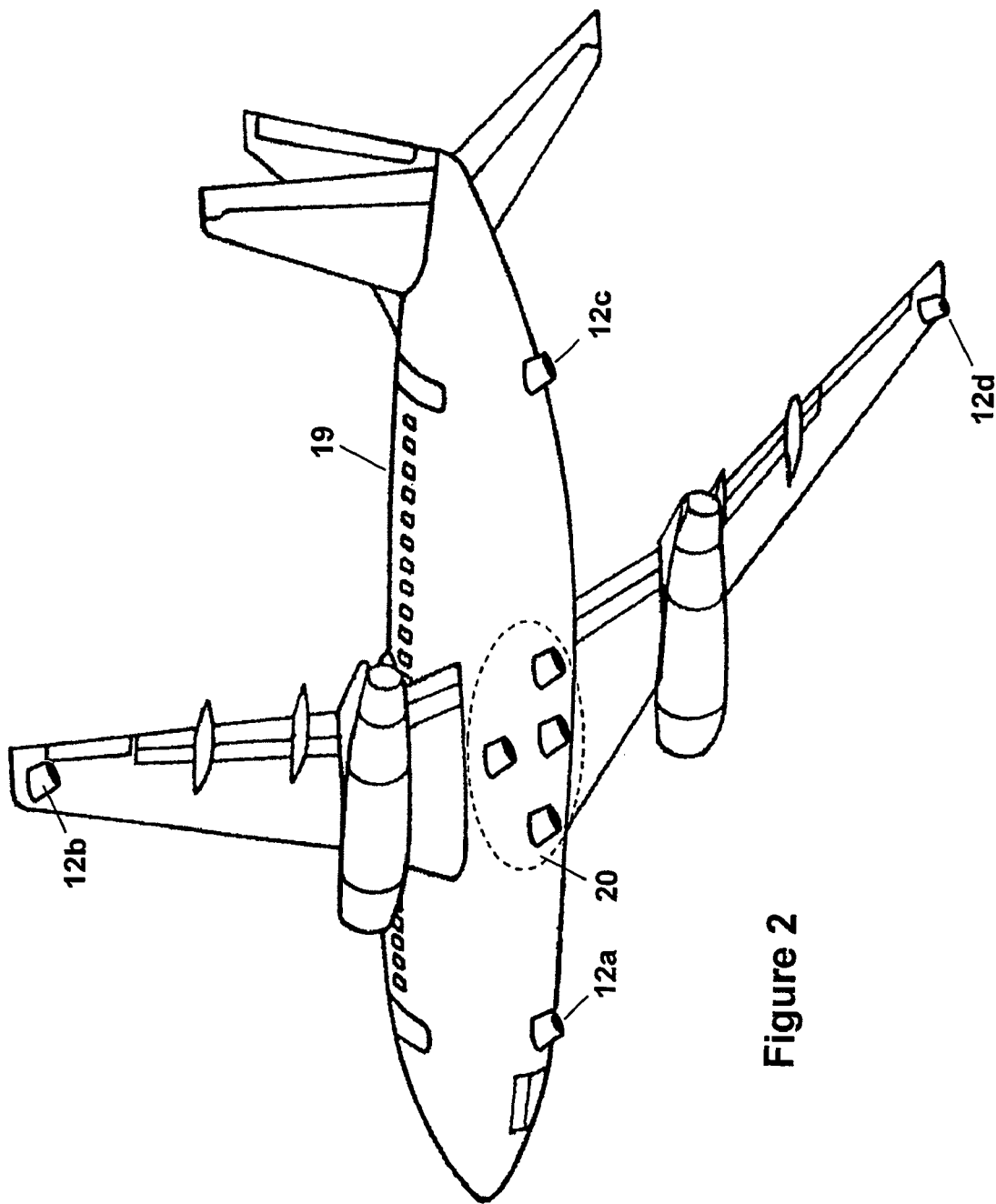
FIG. 2 shows an aircraft on which is mounted a number of individual antennas comprising a DF antenna array for use with the present invention and a small array that represents DF arrays associated with most prior art geolocation techniques.

Antenna array 12 consists of four antenna elements 12a through 12d, as shown on aircraft 19 in FIG. 2. However, more than four antennas may be utilized. The individual antenna elements 12 are arranged in a pattern on aircraft 19, as shown in FIG. 2, to give adequate coverage (pattern gain) over a desired spatial region. However, the antennas 12 may be arranged differently than shown in FIG. 2. The selection of antenna elements 12 and their physical arrangement on aircraft 19 are dependent on the frequencies to be received and their polarization, and there may be more than one set of antennas 12 on aircraft 19 to cover different frequency bands and signal polarization.

In FIG. 1, an incident electromagnetic signal E(t) 26 impinges on antenna array 12 and arrives at each antenna element 12a-d at different times as determined by its angle of incidence $\theta^i$, $\phi^i$ with respect to array 12 and the spacing of the antenna elements 12a through 12d. The actual signal E(t) 26 may comprise a number of co-channel interfering signals but the operation described herein is with only one signal. The voltage terms V(1,t) through V(Na,t) output respectfully from antennas 12a through 12d denote the complex waveform envelope that is output from each of antenna 12 a-d and is the only quantity that conveys information. Therefore, each of the received signals V(1,t)-V(Na,t) represents the complex envelope of the output of one antenna element of antenna array 12 and represents one or more signals, one of which may be a signal of interest and a noise component η(n,t), and is represented by the equation:

$$V(n,t)=E(t)A_r[n,\theta^i,\phi^j]+\eta(n,t) \tag{EQ 2}$$

where "n" corresponds to one of the four antennas comprising antenna array 12, and in V(n,t) designates one of the complex voltages V(1,t) through V(Na,t). E(t) is the incident electromagnetic signal impinging on antenna array 12. $A_r[n,\theta^i,\phi^j]$ is an antenna response vector where is "n" is as defined immediately above, $(\theta^i,\phi^j)$ defines the azimuth and elevation direction $\theta^i$, $\phi^j$ of received signals, and η(n,t) is a noise component of received signal V(n,t).

The voltages V(1,t) through V(Na,t) output respectively from ones of antenna elements 12a through 12d are respectively input to one of receivers 21a through 21d as shown. The signals, in digitized format, output from receivers 21a through 21d are input to signal processing computer 14, and are also carried over leads 22 to circuit 23 where signal samples are measured and processed into individual measurement covariance matrices in a manner well known in the art.

In FIG. 2 is shown an aircraft 19 on which are mounted individual antennas (12a-12d) comprising DF antenna array 12. Antennas 12a and 12c are mounted to the front and rear of the fuselage of aircraft 19. Antennas 12b and 12d are mounted near the ends of the wings of aircraft 19. The spacing of antennas 12a-12d provides a relatively large antenna aperture to facilitate accurate CIGL geolocation solutions.

Each of antennas 12a-12d is a monopole or "blade" type antenna elements for the CIGL process and are arranged in the configuration shown that is symmetric about the centerline of aircraft 19. For many applications, these blade antennas can be replaced by broadband spiral antennas that are receptive to both horizontally and vertically polarized signals.

Also shown in FIG. 2 is a typical prior art layout 20 of airborne DF antennas. They are typically greater in number, although not shown in this figure, and must be spaced closer together than with the present invention. As described in the background of the invention, conventional DF accuracy in the prior art is a balance of a number of antennas comprising a DF antenna array versus their spacing. To achieve high DF accuracy the antennas 20 are spaced as far as possible from each other, but to minimize ambiguities there must be a sufficient number of antennas 20 and they cannot be too far apart. These constraints typically constrain the array to a small area near the center of the fuselage as shown by 20.

The effect of large correlation side lobes created when using a small number of DF array antennas on an aircraft in the prior art is negated using the geolocation method of the present invention where the correlation process is moved from the DF function to the transmitter location function. A smaller number of antennas in the array may be used, coupled with a relatively large antenna aperture, and still achieve high geolocation accuracy.

In operation, signals received on the antennas of a CIGL antenna array are sampled, digitized and stored in a plurality of covariance matrices. A typical processing sequence is as follows: once a second for seventy consecutive seconds the received signals V(1,t)-V(Na,t) received on the individual antennas of antenna array 12 are digitized and sampled at a 100 Kilohertz rate to generate 1024 samples for each antenna of the CIGL antenna array. The seventy sets of signal samples are processed into individual covariance matrices. Thus, sampling is done for approximately ten milliseconds out of every second. The covariance matrices undergo eigenspace decomposition to produce seventy signal array vectors having transmitter azimuth and elevation (θ,φ) and other information for each of the seventy sampling periods. The preferred way to develop an array vector is to decompose a covariance matrix as a signal eigenvector and associate an array vector with the signal eigenvector.

To correct for array distortions a calibration array manifold correlation table constructed during system calibration is accessed to read out data that defines geometric grid locations that define a correlation surface for each of the seventy sampling periods. Thus, over the seventy seconds there is data calculated for seventy geometric correlation surfaces.

Stated another way, geolocation of a remote transmitter is determined by a correlation of measured array vectors, in terms of the measured covariance signal array vectors, with calibration or testing voltage array vectors stored during calibration of the array system.

The data sets for the seventy correlation surfaces are summed and normalized to produce a summed geometric correlation surface which is used to identify the geolocation of a transmitter with respect to the aircraft. Summing the computed seventy correlation surfaces reduces extraneous correlation peaks and develops a maximum correlation peak at the correct geolocation of the remote transmitter.

Each independent geometric correlation surface has a number of peaks, valleys and ridge-lines. Under ideal conditions, the highest ridge-line of each independent correlation surface points in the direction from the aircraft to the remote transmitter. One ridge-line of the summation correlation surface contains a well defined peak that is higher than the correlation values at all other geometric grid locations. The location of this peak indicates the geolocation of the transmitter.

In summary, over a seventy second period, there is data collected and calculated for seventy correlation surfaces. Two of these correlation surfaces are shown in and described with reference to FIGS. 3 and 4. The seventy sets of signals are processed, one at a time, in a covariance matrix in block 23. These surfaces were calculated for the outer cross array shown in FIG. 2. The array assigned 15 meter arms for each leg which makes a total aperture of 30 meters. The numerical experiment assumed an operating frequency of 500 MHz In block 24 each set of covariance matrices undergo eigenspace decomposition to produce signal eigenvectors having azimuth and elevation (θ,φ) and other information for each of the seventy sampling periods that is forwarded to computer 14 via path 25. The eigenvectors are each converted to array vectors as previously described. The functions performed in blocks 23 and 24 are performed by a processor in a manner known in the art. The processor may be part of computer 14 but the functions performed are shown as separate blocks 23 and 24 to aid in understanding the invention. Covariance matrices and eigenspace decompositions are both well known in the art and are used in solving many signal processing problems, such as source location estimation, high-resolution frequency estimation, and beam forming. The parallel receiver channel architecture of covariance matrix processing is used to ensure that all of the seventy correlation surfaces are associated with a single remote transmitter and that the measured data is not corrupted by co-channel RF interference. Multiple co-channel signals are identified by observing measured covariance matrix eigenvalues. Single signal conditions establish one strong signal eigenvalue and Na-1 noise eigenvalues when intercepted by an array of Na antennas and received on Na RF channels.

For adaptive applications in a non-stationary environment, the eigenvalue decomposition is updated with the acquisition of new data and the deletion of old data. This occurs for each of the previously mentioned seventy samples. This situation arises where a transmitter or receiver are moving with relation to each other. For computational efficiency or for real-time applications, an algorithm is used to update the eigenvalue decomposition code without solving the eigenvalue decomposition problem from start again, i.e., an algorithm that makes use of the eigenvalue decomposition of the original covariance matrix. In numerical linear algebra, this problem is called the modified eigenvalue problem.

Figure 3:
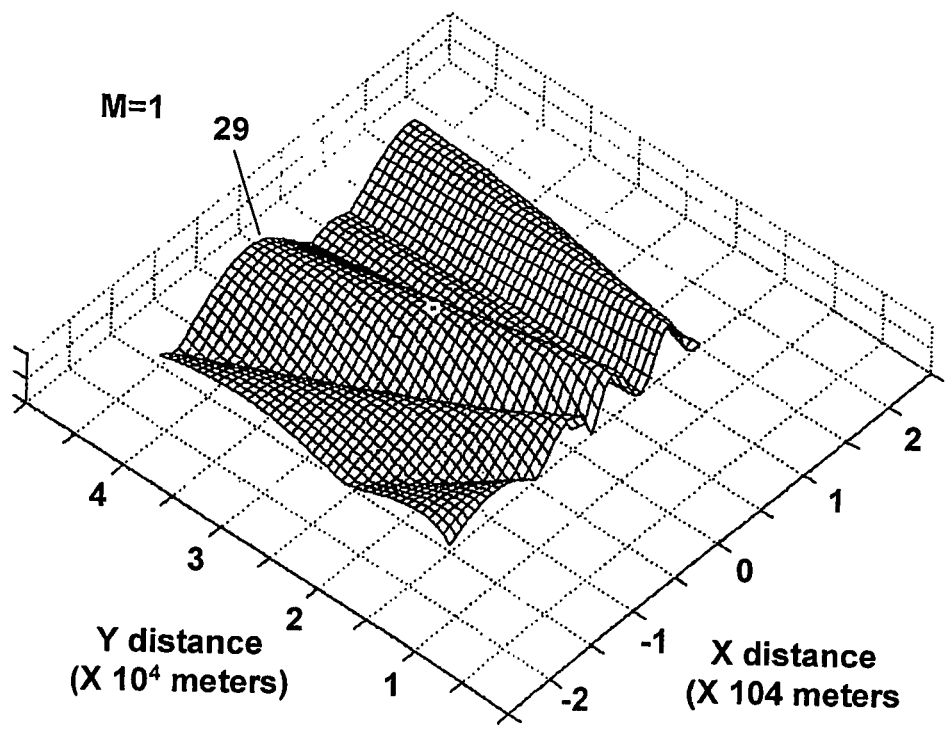
FIGS. 3 and 4 show two of a plurality of correlation surfaces mapping data taken at two points in the flight of an aircraft during which the novel DF equipment was used.
Figure 4:
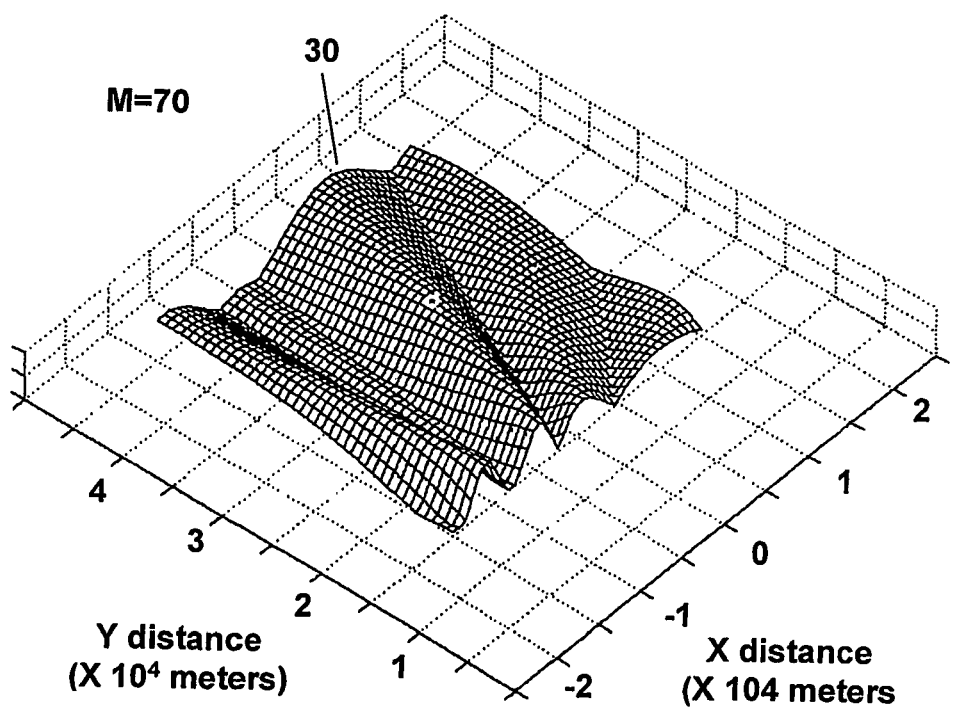

Examples of the correlation surface that may be graphed from each of the seventy sets of signals samples are shown in FIGS. 3 and 4. FIG. 3 shows the correlation surface for the first set of data (m=1) and FIG. 4 shows the correlation surface for the seventieth set of data (m=70). The actual plotting of the correlation surfaces, as shown in FIGS. 3 and 4, is not required to practice the teaching of the invention, but they are shown and described herein to help understand the invention.

Each of the seventy correlation surfaces has one or more valleys and ridge lines, with the highest ridge line being in the general direction of a line of bearing from the aircraft to the remote transmitter. The highest ridge lines are designated 29 in FIGS. 3 and 30 in FIG. 4.

Figure 7:
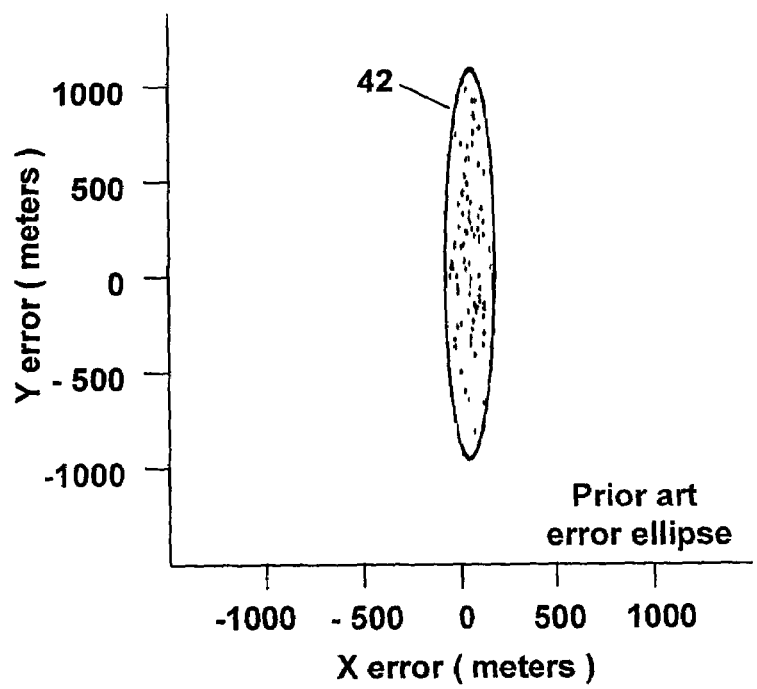
FIG. 7 shows an error ellipse for DF line of bearing fixes made in the prior art.

The seventy correlation surfaces are then summed, grid point by grid point, and normalized to generate a single summation correlation surface such as shown in FIG. 7.

The summation correlation surface also has a number of peaks and valleys, each peak having a ridge hue (32, 36, 38). One ridge line 32 is higher than all other ridge lines. The highest ridge line 32 also has a hump defining a highest peak point 33 that indicates the geolocation of the transmitter with respect to the position of the aircraft in accordance with the teaching of the invention. Summing the pixels of the seventy correlation surfaces reduces extraneous correlation peaks, which fall at different locations in the individual correlation surfaces, and develops the maximum ridge line 32 and its correlation peak 33 indicating the geo-location of the remote transmitter.

An algorithm expressed in Equation (EQ 3) immediately below is used to correlate, mathematically sum and normalize the seventy sets of correlation surface data:

$$|R(x^i,y^j)|^2 = \frac{1}{Msts}\sum_{m=1}^{m=Msts}\left[\frac{\left|\sum_{1}^{Na}Q_{m,n}^*A_{m,n}(x^i,y^j)\right|^2}{\left(\sum_{n=1}^{Na}|Q_{m,n}|^2\right)\left(\sum_{n=1}^{Na}|A_{m,n}(x^i,y^j)|^2\right)}\right] \quad \text{EQ 3}$$

where $|R(x^i,y^j)|^2$ defines the grid points defining a summation correlation surface over a set of $(x^i,y^j)$ grid points derived from the aforementioned seventy sets of samples. $Q_{m,n}$ is the set (Msts) of array vector measurements at n=1 to n=Na antennas from antenna array 12, equal to seventy for the embodiment of the invention described herein, given by the first signal array vector of each measured covariance matrix Na=4 for antenna array 12. 1/Msts normalizes the summation result by dividing the summation result by the number of data sets being summed, and Msts equals seventy in this example. $A_{m,n}(x^i,y^j)$ is the set of calibration vectors retrieved from the calibration array manifold after mapping from spherical angles $(\theta^i,\phi^j)$ to calculate the data used to define each correlation surface. The generation of calibration vectors to correct for array distortions and electromagnetic scattering is described further in this Detailed Description. Two of these seventy correlation surfaces are shown in and described hereinafter with reference to FIGS. 3 and 4.

A conjugate gradient search is then performed over the surface of the summation correlation surface in FIG. 7 to locate the highest point 33 on the highest ridge line 32 of the surface. Conjugate gradient searching is known in the prior art See a book by W. H. Press, B. P. Flannery, S. A. Teukolsky and W. T. Vetterling, "Numerical Recipes", Cambridge University Press, Cambridge UK, 1986. It has been demonstrated that for certain types of functions, quadratic functions for example, the use of conjugate gradient direction processing allows convergence to a solution more quickly than the gradient direction. The standard conjugate gradient direction, when calculated at a given point, takes into account the direction of the previous step as well as the newly calculated gradient direction at the given point. If the direction of the step previously taken is designated by the vector B and the newly calculated gradient direction at the given point designated as D, then the conjugate gradient direction at the given point is defined by the vector:

$$C_{conj}=D+hB \quad \text{(EQ 4)}$$

where h is a constant which determines the "weight" afforded the previously selected direction. Although the error function to be dealt with herein is not a quadratic function, the technique of tempering the gradient direction based on its past performance has been found useful and is implemented in the present embodiment. For certain types of error functions, it has been found that the use of the conjugate gradient direction avoids the tortuous path of almost perpendicular steps which can arise when using a simple gradient technique.

The CIGL geo-location of the present invention is based on a conjugate gradient multi-dimensional search for the minimum of the function $F(1-R^2)=1-CIGL(|R|^2)$. The term $(1-R^2)$ used in (EQ 4) causes the result of the conjugate gradient searching to be a minimum rather than a maximum. A starting point in the neighborhood of the minimum is selected and the gradient of $F(1-R^2)$ as a function of x and y for this point is computed. Next a line search for the minimum in this first gradient direction is solved for. At this line search minimum, a new gradient is computed which is then inserted into a conjugate gradient routine that computes the next direction for the line search which is then searched for a minimum, and so on. These search steps quickly converge to a minimum which is identified by slope gradient computations that are approximately equal to zero. The multipoint search path to the minimum point 33 of $F(1-R^2)$ is a path to the maximum of $CIGL(|R|^2)$ which is mapped as line 39 to point 33 in FIG. 6. The correlation function $CIGL(|R|^2)$ is always less than unity, therefore $F(1-R^2)$ is always greater than zero.

Figure 5:
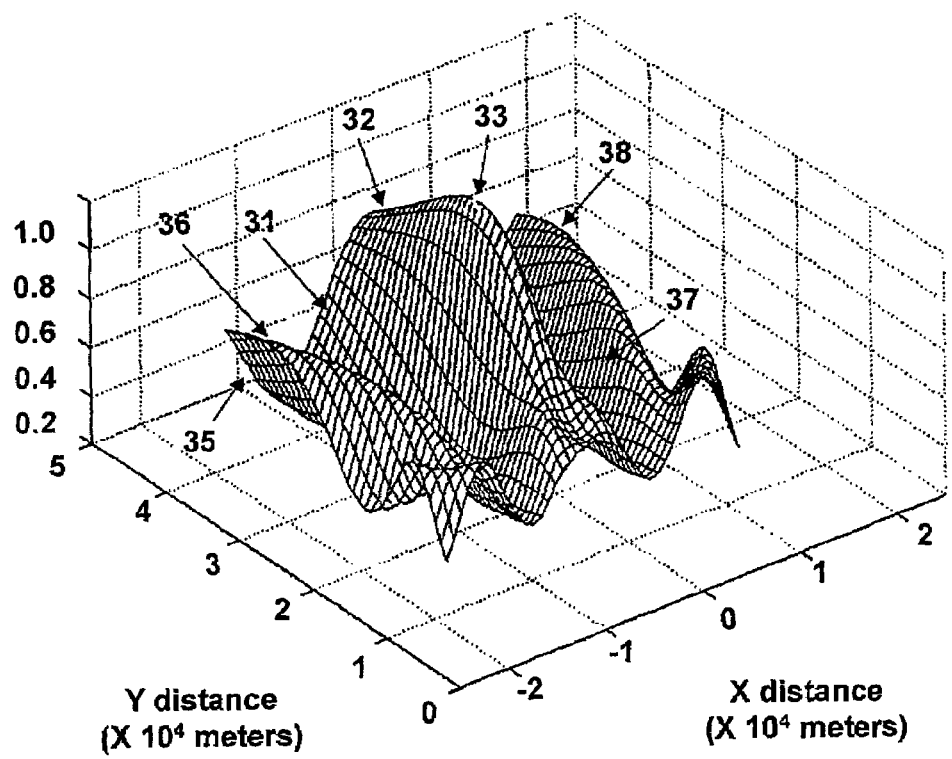
FIG. 5 shows the summation correlation surface that is produced as a result of summation and normalization of the plurality of correlation surfaces.

To find the highest point 33 at the highest peak of ridge line 31 and thereby identify the geographical location of the remote transmitter the previously described conjugate gradient searching must be performed starting at many points on summation surface 31 in FIG. 5. The reason for this is as follows. In FIG. 5 it should be noted that there is the highest ridge peak line 32 and two lower ridge peak lines 36 and 38.

If a starting point for a conjugate gradient searching sequence is chosen on sloped side 35, the conjugate gradient searching will erroneously find a peak point on lower ridge line 36 and not on ridge line 32. Similarly, if a starting point for another sequence of conjugate gradient searching is chosen on sloped side 37, the conjugate gradient searching will erroneously find a peak point on lower ridge line 38 and not on ridge line 32. Thus, by choosing a number of conjugate gradient search starting points around the data that defines the summation correlation surface, some of them will fall on the slopes 31 that define the highest ridge line 32 and the peak point 33. The minimization results of the plurality of conjugate gradient searches are then compared each other to find the minimum value that will correspond to point 33 that identifies the geolocation of the transmitter.

Figure 6:
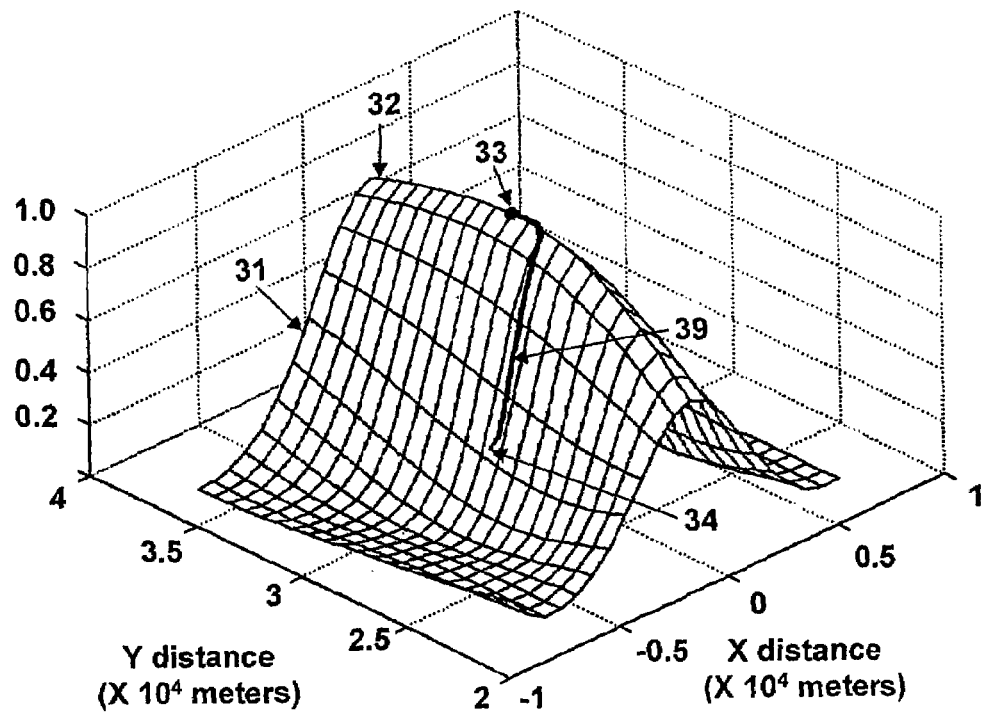
FIG. 6 shows the application of conjugate gradient processing to the data reflecting the summation correlation surface to indicate the geolocation of a remote transmitter.

FIG. 6 shows only a portion of the correlation surface in FIG. 5. This is done to better illustrate the searching function using conjugate gradient processing. When an arbitrary point, such as point 34 is picked it is generally no more than four or five computational steps to travel path 39 and get from starting point 34 to point 33 which is the highest peak of ridge 32. By making use of conjugate gradient based, second derivative information, as well as the rate of change of the slope of the correlation surface, calculation times are greatly reduced. Conjugate gradient at descent proceeds not down the slope gradient but instead in a direction that is conjugate to the direction of the previous step of calculation. The minimization done on the previous step is not undone by the next step since the gradient stays perpendicular to the previous step.

Figure 9:
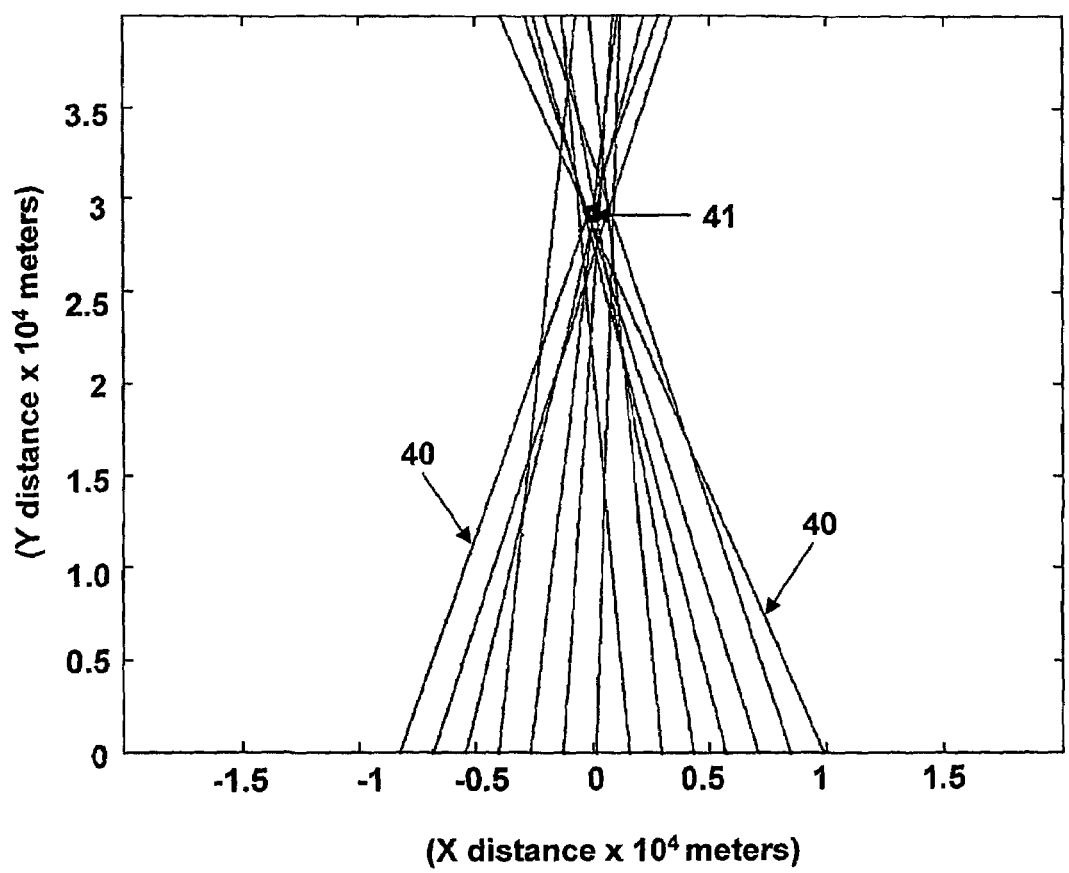
FIG. 9 is a graph of lines of bearing for prior art direction finding.

Error ellipses are well known in the art and they provide a statistical error indication of an expected solution. An error ellipse is calculated from data based on numerical experiments. In the present application an error ellipse indicates the most probable locations of a remote transmitter with respect to its calculated position. Error ellipses are usually specified in terms of a center point, a major and minor axis length, and the azimuth of the major axis. In FIGS. 9 and 10 both ellipses are calculated with a 90% confidence error. The meaning of the 90% confidence error ellipse is that if more points are added to improve the calculation of the circle, there is 90% probability that the center of the circle will remain within the area specified by the ellipse.

Numerical experimental measurements made using both prior art direction finding techniques and the teaching of the present invention were made receiving signals from a transmitter operating at a frequency of 500 MHz, with a signal to noise ratio (SNR) of 20 db. The aircraft flew at an altitude of 5000 meters along a straight path at 345 knots. The nearest approach to the target transmitter was 30 kilometers. The four antenna cross array is represented as array 20 shown in FIG. 2. This array had four, equal length, 2 meter legs which develops a 4 meter array aperture. The maximum interferometer unambiguous operating frequency for this array is slightly above 500 MHz.

FIG. 9 shows a plot of portions of a plurality of lines of bearing (LOBs) 40 made using prior art direction finding techniques from an aircraft that is moving from left to right, parallel to but spaced from the X axis. The LOBs for this numerical experiment theoretically intersect at a point (0,30 km) which is the actual location of the remote transmitter, but due to random noise at a 20 dB SNR level the LOB's do not all intersect at this point. The transmitter fix 41, based on these LOBs, was computed using equations published by N. M. Blackman, "Position Determination from Radio Bearings", IEEE Transactions on Aerospace and Electronic Systems, pp 558-560, May 1969. FIG. 10 shows an error ellipse for a number of geo-location fixes made using the prior art interferometer direction finding method and the 4 meter cross array operating a 500 MHz and a 20 dB SNR. The error ellipse calculated had a minor axis of 196 meters and a major axis of 920 meters. These figures mean that there is 90% confidence that a remote transmitter lies within the ellipse that is 1842 meters long and 292 meters wide.

Figure 8:
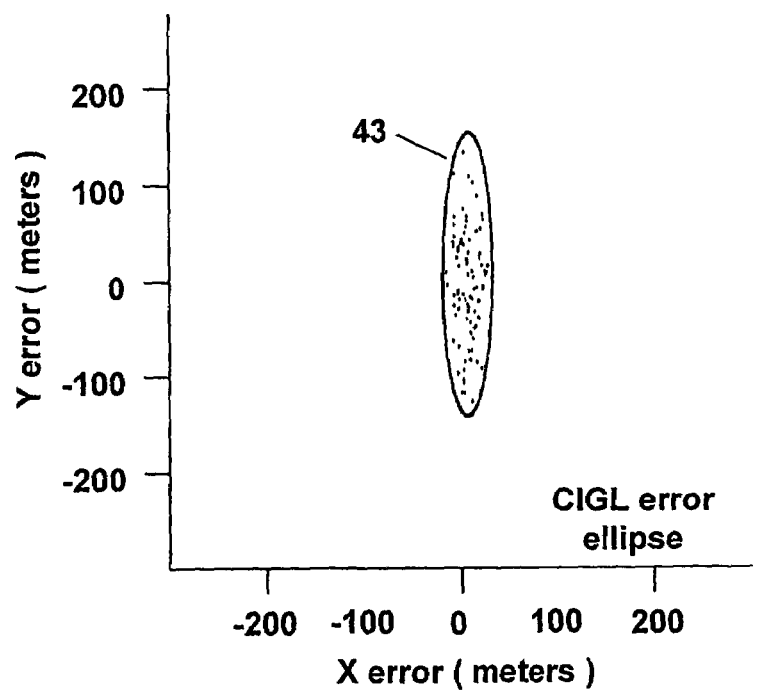
FIG. 8 shows an error ellipse reflecting the more accurate geo-location fixes made using the teaching of the present invention.

In contrast FIG. 8 shows an error ellipse reflecting more accurate geo-location fixes made using the teaching of the present invention and the same operating parameters. With the same setup for accurate comparison, and using the Correlation Interferometer Geo Location (CIGL) of the present invention, the minor axis is 25 meters and the major axis is 161 meters. These figures mean that there is 90% confidence that a remote transmitter lies within the ellipse that is 332 meters long and 50 meters wide. This is a very significant improvement over the prior art. The improvement is due to the ability to operate CIGL with a much larger aperture.

Since the aircraft 19 on which the DF antenna array 12 is mounted creates perturbations such as electromagnetic scattering and glint, the results from the geolocation determination described above would have errors that must be compensated for. This compensation uses a calibration array manifold of calibration data developed during one or more test flights of the aircraft on which the Correlation Interferometer Geo Location (CIGL) equipment of the present invention is located.

To develop these calibration vectors the aircraft is flown over a plurality of known paths with respect to a transmitter which is at a known location. A plurality of geolocation determinations are made, as described above, as the aircraft travels the paths. During each of the seventy sampling periods of slightly over ten milliseconds a measured array vector is determined for each the associated seventy covariance matrices and is used to determine spherical coordinates ($\theta,\phi$) from the aircraft to the transmitter. With both the position of the transmitter being known, and the position of the aircraft at any particular time being known, as determined by a navigational system, such as the global positioning system, the actual geolocation X,Y coordinates of the transmitter with respect to the aircraft at the time each sample is taken is known. Each vector in spherical coordinates ($\theta,\phi$), along with data defining the actual X,Y geolocation of the transmitter when the vector is measured is stored the array manifold calibration table. This is repeated a large plurality of times to create the calibration array manifold in all directions around the aircraft, with the transmitter at different distances from the aircraft, and with the aircraft at different altitudes.

In the above description no mention is made of the polarization of received signals. Polarization independent direction finding is imperative if the receiving array cannot be made identically polarized to a received signal. This problem can arise, for example, when the receiving antennas are mounted on various locations on the aircraft. The interaction between the antennas and the aircraft can cause the relative magnitudes and phases between the antenna pairs to vary with incident signal polarization. Thus, it is advantageous to utilize an antenna array 12 of diversely polarized antennas since multiple signals can be resolved on the basis of polarization as well as angle of arrival (AOA). This added information improves AOA accuracy in general. For more information on performing direction finding with diversely polarized antenna arrays see a paper by E. R. Ferrara and T. M. Parks, "Direction Finding with an Array of Antennas Having Diverse Polarizations," IEEE Trans. Antennas Propagation, vol. AP-31, pp. 231-236, March 1983.

The present invention can be utilized with diversely polarized antennas in a DF antenna array. This is called Polarization Independent CIGL (PI-CIGL). PI-CIGL is designed to geo locate transmitters that are transmitting from arbitrarily or differently polarized antennas. PI-CIGL is designed to accomplish this task by using an antenna array having elements that are diversely polarized. PI-CIGL is based on the same measurement covariance matrices and eigenvalue decomposition as CIGL. PI-CIGL uses a dual calibration array manifold acquired by calibrating an aircraft DF antenna array using orthogonal polarizations such as vertical and horizontal and/or right and left circular. The PI-CIGL equation based on polarization dependent $A^{p1}(\theta,\phi)$ and $A^{p2}(\theta,\phi)$ calibration array manifolds is shown in the equation in FIG. 10. In that equation, which is similar to the correlation surface summation and normalization equation (EQ 4), the terms are:

$|R(x^i,y^j)|^2$ is a global correlation surface over a set of $(x^i,y^j)$ pixels. $Q_{m,n}$ is the set of Msts antenna array vector measurements given by the first signal array eigenvector of each measured covariance matrix.

The summation of $|Q_{m,n}|^2$ over Na antennas is equal to unity for each measurement, which is the conventional eigenvector normalization. $A^{p1}{}_{m,n}(x^i,y^j)$ is the first set of calibration vectors retrieved from the array calibration manifold after mapping from spherical angles $(\theta^i,\phi^j)$.

$A^{p2}{}_{m,n}(x^i,y^j)$ is the second set of calibration vectors retrieved from the array calibration manifold after mapping from spherical angles $(\theta^i,\phi^j)$.

$\rho^{p1}{}_m$ is the complex coefficient for the first polarization vector, this quantity can change from measurement to measurement.

$\rho^{p2}{}_m$ is the complex coefficient for second polarization vector, and this quantity can change from measurement to measurement.

Geo location solutions based on the PI-CIGL equation above depend on searching over $(x^i, y^j)$ space and identifying the transmitter location as the $(x,y)$ value that maximizes the correlation value. This maximum also depends on the value of the complex polarization coefficients, $\rho^{p1}{}_m$ and $\rho^{p2}{}_m$. Since the value of these terms depends on the transmitter antenna they are usually unknown and must be solved for. This is accomplished by maximizing the PI_CIGL equation over these parameters for each measurement period. PI-CIGL is, in terms of $\rho^{p1}{}_m$ and $\rho^{p2}{}_m$, the ratio of quadratic forms which can be maximized in closed form with the maximum given by the maximum eigenvalue of the characteristic equation of regular Hermitian forms. This maximization can be simplified if the array calibration manifolds are generated by mapping the data measured for array calibration into ortho-normal calibration manifolds as described below.

Assuming that two sets of antenna voltages are measured during transmissions from the same transmitter, the first set of antenna voltages based on radiation from a vertical transmit antenna, and the second set of antenna voltages based on radiation from a horizontal transmit antenna. The measured vectors are represented by $V_n(\theta^i,\phi^j)$ and $H_n(\theta^i,\phi^j)$. Linear combinations of these two sets of measurements are used to represent voltages established by arbitrarily polarized radiation. Ortho-normal calibration array manifolds are constructed from the two sets of measurements in the mathematical form:

$$\begin{bmatrix} A^{p1}(\theta^i, \phi^j) \\ A^{p2}(\theta^i, \phi^j) \end{bmatrix} = \begin{bmatrix} M^{i,j}(1,1) & M^{i,j}(1,2) \\ M^{i,j}(2,1) & M^{i,j}(2,2) \end{bmatrix} \begin{bmatrix} V(\theta^i, \phi^j) \\ H(\theta^i, \phi^j) \end{bmatrix} \quad (EQ\ 5)$$

where the center matrix M in (EQ 5) establishes the equations of (EQ 6) immediately below.

$$\sum_{n=1}^{Na} A_n^{p1}(\theta^i, \phi^j)^* A_n^{p1}(\theta^i, \phi^j) = 1$$

$$\sum_{n=1}^{Na} A_n^{p2}(\theta^i, \phi^j)^* A_n^{p2}(\theta^i, \phi^j) = 1$$

$$\sum_{n=1}^{Na} A_n^{p1}(\theta^i, \phi^j)^* A_n^{p2}(\theta^i, \phi^j) = 0$$

Linear combinations of $A^{p1}(x^i,y^j)$ and $A^{p2}(x^i,y^j)$, as established by multiplying the center M matrix by $V(\theta^i,\phi^j)$ and $H(\theta^i,\phi^j)$, can also represent voltages received under arbitrarily polarized radiation. Under these conditions, the simplified denominator of the PI-CIGL equation for each normalized set of $Q_m$ measurements is simply:

$$[\rho^{p1} \ \rho^{p2}] \begin{bmatrix} 1 & 0 \\ 0 & 1 \end{bmatrix} \begin{bmatrix} \rho^{p1*} \\ \rho^{p2*} \end{bmatrix} \quad (EQ\ 7)$$

The maximized value of PI-CIGL, over the polarization parameters, is given by the sum of the maximum eigenvalues:

$$|R(x^i, y^j)|^2 = \frac{1}{Msts} \sum_{m=1}^{m=Msts} \{\lambda_m^{i,j}\} \quad (EQ\ 8)$$

where $\lambda^{i,j}{}_m$ is the maximum eigenvalue of the matrix:

$$\begin{bmatrix} |\sum Q_{m,n}^* A_{m,n}^{p1}(x^i, y^j)|^2 & \sum Q_{m,n}^* A_n^{p1}(x^i, y^j) \sum Q_{m,n} A_{m,n}^{p2}(x^i, y^j)^* \\ \sum Q_{m,n}^* A_{m,n}^{p2}(x^i, y^j) \sum Q_{m,n} A_{m,n}^{p1}(x^i, y^j)^* & |\sum Q_{m,n}^* A_{m,n}^{p2}(x^i, y^j)|^2 \end{bmatrix} \quad (EQ\ 9)$$

where the summation runs over the number of antennas, n=1: n=Na. The maximum eigenvalue of this |2×2| matrix is the extremely simple form:

$$\lambda_m^{i,j} = |\Sigma Q_{m,n}^* A_{m,n}^{p1}(x^i, y^j)|^2 + |\Sigma Q_{m,n}^* A_{m,n}^{p2}(x^i, y^j)|^2. \qquad (EQ\ 10)$$

With CIGL processing using these equations, plus conjugate gradient searches, polarization independent direction finding may also be accomplished.

While what has been described herein is the preferred embodiment of the invention, numerous changes may be made without departing from the spirit and scope of the invention. For example, while the embodiment taught herein takes signal samples once every second for seventy seconds at a 100 kiloHertz rate for slightly longer than 10 milliseconds (a total of 1024 samples), these numbers Should be changed for different RF bandwidths and measurement periods In addition, while working with only one signal at a time is described herein, other known technologies may be used to first separate co-channel interfering signals and geo-locate one or all of these incident waves.

The invention claimed is:

1. A method for receiving electromagnetic radiation with a plurality of antennas and a plurality of receivers, which received electromagnetic radiation is subject to electromagnetic scattering perturbations caused by a platform on which the antennas are mounted, and producing an output that is substantially unaffected by the perturbations and indicates the geolocation of the source of the electromagnetic radiation, the method comprising the steps of:
   (a) forming a plurality of covariance matrices from a like plurality of sets of samples of the received electromagnetic radiation received with the plurality of antennas and receivers, each matrix yielding a measured array vector;
   (b) correlating each of the plurality of measured array vectors yielded in step (a) with testing array vectors previously stored during calibration of the receivers and antennas, and retrieving geolocation information associated with correlated, stored testing array vectors, the plurality of geolocation information retrieved being substantially unaffected by the perturbations;
   (c) summing the plurality of retrieved geolocation information obtained during correlation in step (b) to produce a summation set of geolocation data that has a distinctive point that indicates the geolocation of the source of the electromagnetic radiation; and
   (d) searching the summation set of geolocation data to identify the distinctive point that indicates the geolocation of the source of the electromagnetic radiation.

2. The method for receiving electromagnetic radiation of claim 1 wherein the receiver is moving and the source of electromagnetic radiation is fixed.

3. The method for receiving electromagnetic radiation of claim 2 wherein the testing array vectors and their associated geolocation information are generated when the source of electromagnetic radiation is at a fixed position and the receiver is moved over a predetermined path, and the location of the source and the receiver are both known during testing so accurate geolocation information can be calculated for the source of electromagnetic radiation and stored with each testing array vector.

4. The method for receiving electromagnetic radiation of claim 3 wherein the searching performed in step (d) consists of multiple conjugate gradient searches performed on the summation set of geolocation data to clearly identify the distinctive point that indicates the geolocation of the source of the electromagnetic radiation.

5. The method for receiving electromagnetic radiation of claim 4 wherein by summing the sets of geolocation data retrieved during step (b) extraneous correlation peaks therein are minimized and a maximum correlation peak is developed at the distinctive point to clearly indicate the geo-location of the source of the electromagnetic radiation.

6. The method for receiving electromagnetic radiation of claim 5 wherein the sets of samples of step (a) are produced by sampling the received electromagnetic radiation for a portion of each second of time and for a plurality of sequential seconds.

7. The method for receiving electromagnetic radiation of claim 6 wherein the method is independent of the polarization of the electromagnetic radiation.

8. The method for receiving electromagnetic radiation of claim 1 wherein the testing array vectors and their associated geolocation information are generated when the source of electromagnetic radiation is at a fixed position and the receiver is moved over a predetermined path, and the location of the source and the receiver are both known during testing so accurate geolocation information can be calculated for the source of electromagnetic radiation and stored with each testing array vector.

9. The method for receiving electromagnetic radiation of claim 8 wherein the searching performed in step (d) consists of multiple conjugate gradient searches performed on the summation set of geolocation data to clearly identify the distinctive point that indicates the geolocation of the source of the electromagnetic radiation.

10. The method for receiving electromagnetic radiation of claim 9 wherein the receiver is moving and the source of electromagnetic radiation is fixed.

11. The method for receiving electromagnetic radiation of claim 1 wherein the searching performed in step (d) consists of multiple conjugate gradient searches performed on the summation set of geolocation data to clearly identify the distinctive point that indicates the geolocation of the source of the electromagnetic radiation.

12. The method for receiving electromagnetic radiation of claim 11 wherein the receiver is moving and the source of electromagnetic radiation is fixed.

13. The method for receiving electromagnetic radiation of claim 12 wherein the testing array vectors and their associated geolocation information are generated when the source of electromagnetic radiation is at a fixed position and the receiver moves over a predetermined path, and the location of the source and the receiver are both known during testing so accurate geolocation information can be calculated for the source of electromagnetic radiation and stored with each testing array vector.

14. The method for receiving electromagnetic radiation of claim 13 wherein the sets of samples of step (a) are produced by sampling the received electromagnetic radiation for a portion of each second of time and for a plurality of sequential seconds.

15. A method for receiving electromagnetic radiation sent by a transmitter at a fixed location with a plurality of antennas and a plurality of receivers on a moving platform, which received electromagnetic radiation is subject to environmental perturbations caused by the platform, and producing an output that is substantially unaffected by the perturbations and indicates the geolocation of the transmitter, the method comprising the steps of:

(a) forming a plurality of covariance matrices from a like plurality of sets of samples of the electromagnetic radiation received by the plurality of antennas and receivers, the sampling being performed for a portion of each second of time and for a plurality of sequential seconds;

(b) decomposing all matrices to yield a plurality of measured array vectors;

(c) correlating each of the measured array vectors produced is step (b) with testing array vectors previously stored during calibration of the receiver and antennas, and retrieving geolocation information associated with a stored testing array vector that most closely matches each of the plurality of measured array vectors, the plurality of geolocation information retrieved being substantially unaffected by the perturbations;

(d) summing the plurality of retrieved geolocation information obtained during correlation in step (c) to produce a summation set of geolocation data that has a distinctive point that indicates the geolocation of the transmitter; and (e) performing multiple conjugate gradient searches on the summation set of geolocation data to identify the distinctive point that indicates the geolocation of the transmitter.

16. The method for receiving electromagnetic radiation of claim 15 wherein the testing array vectors and their associated geolocation information are generated when the source of electromagnetic radiation is at a fixed position and the receiver is moved over a predetermined path, and the location of the source and the receiver are both known during testing so accurate geolocation information can be calculated for the source of electromagnetic radiation and stored with each testing array vectors.

17. The method for receiving electromagnetic radiation of claim 1 wherein the testing array vectors previously stored during calibration of the receivers and antennas and mentioned in step (b) are generated by the steps of:

(e) moving the platform over a predetermined path while the source of electromagnetic radiation is at a fixed position, and the location of the source and the platform are both known during calibration so geo-location information can be calculated for the source of electromagnetic radiation at each location of the platform;

(f) calculating the correct geo-location of the source of electromagnetic radiation with respect to the platform for each testing array vector, based on the known position of the platform and source; and (g) storing each testing array vector and the associated calculated geo-location of the source of electromagnetic radiation in a correlation table for use in step (b) to indicate the geo-location of the source of the received electromagnetic radiation.

18. A computer readable medium containing executable instructions for processing electromagnetic signals received by a plurality of antennas and a plurality of receivers and producing an output that is substantially unaffected by perturbations caused by a platform on which the antennas and receivers are mounted, and indicating the geo-location of the source of the electromagnetic signals, the executable program instructions comprising program instructions for:

(a) forming a plurality of covariance matrices from a like plurality of sets of samples of the received electromagnetic radiation received with the plurality of antennas and receivers, each matrix yielding a measured array vector;

(b) correlating each of the plurality of measured array vectors yielded in step (a) with testing array vectors previously stored during calibration of the receivers and antennas, and retrieving geo-location information associated with correlated, stored testing array vectors, the plurality of geo-location information retrieved being substantially unaffected by the perturbations;

(c) summing the plurality of retrieved geo-location information obtained during correlation in step (b) to produce a summation set of geo-location data that has a distinctive point that indicates the geo-location of the source of the electromagnetic radiation; and (d) searching the summation set of geo-location data to identify the distinctive point that indicates the geo-location of the source of the electromagnetic radiation.

* * * * *